(12) United States Patent
Nakano et al.

(10) Patent No.: US 9,994,660 B2
(45) Date of Patent: Jun. 12, 2018

(54) (METH) ACRYLIC ACID COPOLYMER AND METHOD FOR MANUFACTURING SAME

(71) Applicant: NIPPON SHOKUBAI CO., LTD., Osaka-shi, Osaka (JP)

(72) Inventors: Masato Nakano, Osaka (JP); Yuki Sano, Osaka (JP)

(73) Assignee: Nippon Shokubai Co., Ltd., Osaka (JP)

( * ) Notice: Subject to any disclaimer, the term of this patent is extended or adjusted under 35 U.S.C. 154(b) by 0 days. days.

(21) Appl. No.: 14/388,166

(22) PCT Filed: Mar. 29, 2013

(86) PCT No.: PCT/JP2013/059558
§ 371 (c)(1),
(2) Date: Sep. 25, 2014

(87) PCT Pub. No.: WO2013/147171
PCT Pub. Date: Oct. 3, 2013

(65) Prior Publication Data
US 2015/0051363 A1    Feb. 19, 2015

(30) Foreign Application Priority Data
Mar. 30, 2012 (JP) .................. 2012-078894

(51) Int. Cl.
| | | |
|---|---|---|
| C08F 216/14 | (2006.01) | |
| C08F 220/06 | (2006.01) | |
| C02F 5/10 | (2006.01) | |
| C23F 11/173 | (2006.01) | |
| C23F 14/02 | (2006.01) | |

(52) U.S. Cl.
CPC .......... *C08F 216/1466* (2013.01); *C02F 5/10* (2013.01); *C08F 216/1416* (2013.01); *C08F 220/06* (2013.01); *C23F 11/173* (2013.01); *C23F 14/02* (2013.01); *C08F 216/14* (2013.01); *C08F 2216/1475* (2013.01)

(58) Field of Classification Search
CPC ............................ C08F 220/06; C08F 216/14; C08F 216/1416; C08F 2216/1475; C08F 216/1466
See application file for complete search history.

(56) References Cited

U.S. PATENT DOCUMENTS

| | | | |
|---|---|---|---|
| 6,310,156 B1 * | 10/2001 | Maeda ................ | C08F 20/06 526/234 |
| 2007/0049710 A1 * | 3/2007 | Kozuki ................ | B01J 14/00 526/68 |

FOREIGN PATENT DOCUMENTS

| | | |
|---|---|---|
| JP | 2002-3536 | 1/2002 |
| JP | 2004-307588 | 11/2004 |
| JP | 2005-264190 | 9/2005 |
| JP | 2006347784 A * | 12/2006 |
| JP | 2012-188586 | 10/2012 |

* cited by examiner

Primary Examiner — Ling Choi
Assistant Examiner — David L Miller
(74) Attorney, Agent, or Firm — Hamre, Schumann, Mueller & Larson, P.C.

(57) ABSTRACT

The (meth)acrylic acid-based copolymer of the present invention includes, as essential structural units: 16 mol % or more but 24 mol % or less of a structural unit (a) derived from a monomer represented by Formula (1):

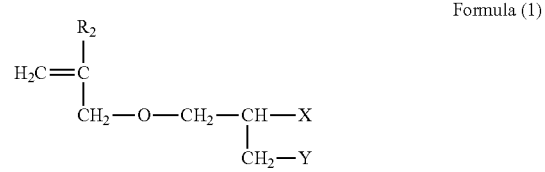

Formula (1)

wherein $R_2$ represents a hydrogen atom or a methyl group; and X and Y each independently represent a hydroxy group, a sulfonic acid group, or a sulfonic acid salt group, at least one of X and Y representing a sulfonic acid group or a sulfonic acid salt group; and 76 mol % or more but 84 mol % or less of a structural unit (b) derived from (meth)acrylic acid or a salt thereof, each based on 100 mol % of all the structural units derived from monomers, the copolymer comprising a main chain having a sulfonic acid group or a sulfonic acid salt group at at least one end thereof, the copolymer having a weight average molecular weight of 1000 to 18000.

9 Claims, 1 Drawing Sheet

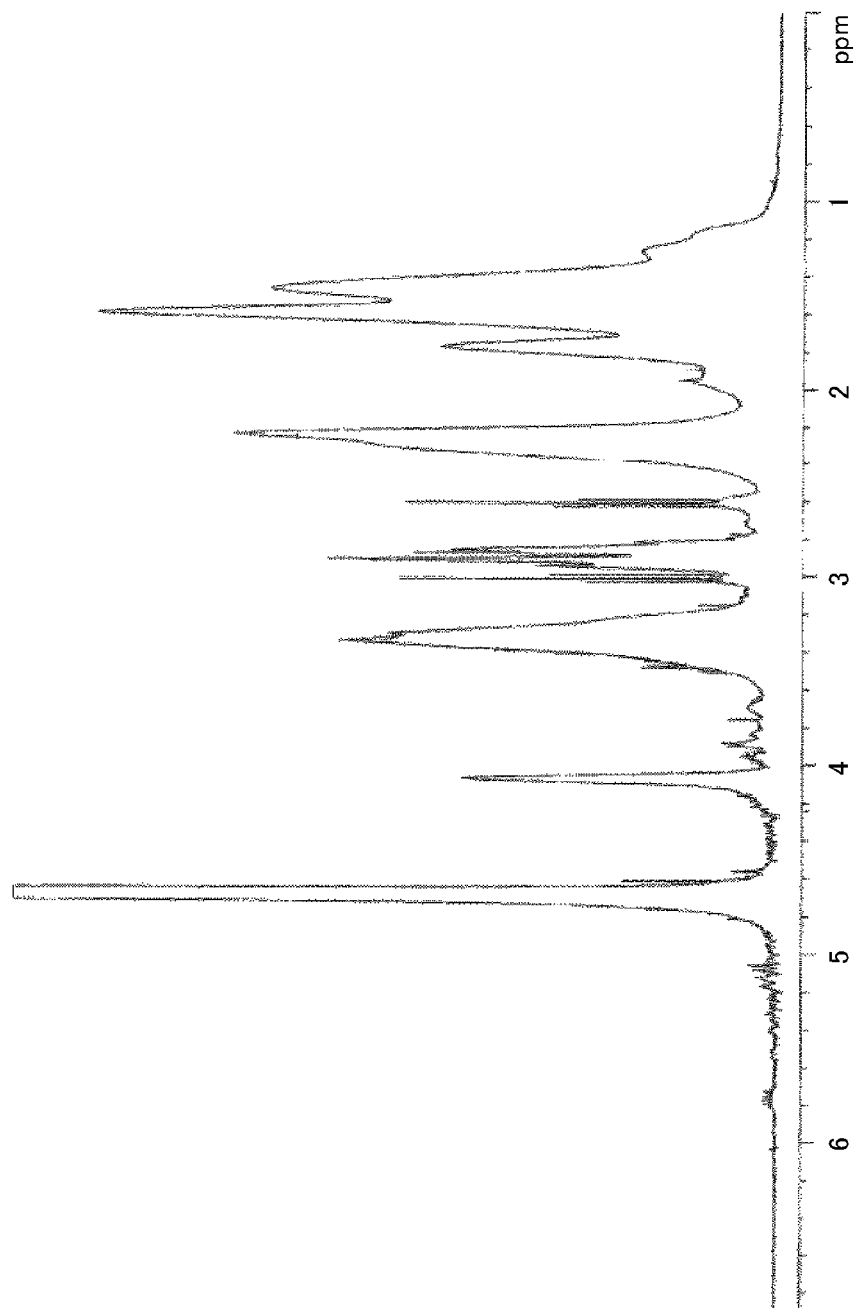

(METH) ACRYLIC ACID COPOLYMER AND METHOD FOR MANUFACTURING SAME

TECHNICAL FIELD

The present invention relates to a (meth)acrylic acid-based copolymer suitably used in a scale inhibitor, a dispersing agent, and the like. The present invention also relates to a method of producing the copolymer.

BACKGROUND ART

Low molecular weight polymers among water-soluble polymers such as (meth)acrylic acid-based polymers are excellent in chelating ability and dispersibility, and therefore, they have been suitably used as such additives as dispersants for inorganic pigments, metal ions, and the like, or scale inhibitors. The scale inhibitors, for example, are often used in cooling water systems where highly concentrated water is used so as to save resource and water, high-hardness water systems for decrease in water quality, or water systems with high salt concentration water such as sea water. However, in such water systems, the polymers disadvantageously gel and precipitate, resulting in a significant decrease in the scale inhibiting ability.

Patent Literature 1 discloses a (meth)acrylic acid-based copolymer which comprises a structural unit derived from a (meth)acrylic acid-based monomer represented by Formula (R1) below and a structural unit derived from a monoethylenic unsaturated monomer copolymerizable with the (meth)acrylic acid-based monomer. The copolymer includes a main chain that has a sulfonic acid group (which may be in the form of an ammonium salt, an alkali metal salt, or an organic amine group salt) at at least one end thereof. The structural unit derived from a monoethylenic unsaturated monomer at least comprises a structural unit derived from a (meth)allyl ether-based monomer represented by Formula (R2) below. The proportion of the structural unit derived from a (meth)acrylic acid-based monomer is 70 to 95 mol %, and that of the structural unit derived from a (meth)allyl ether based-monomer is 5 to 30 mol %. The copolymer has a gel resistance determined by a gel resistance test in a calcium ion-containing water system of 100 to 1500.

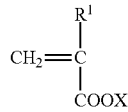

Formula (R1)

In Formula (R1), $R^1$ represents a hydrogen atom or a methyl group, and X represents a hydrogen atom, a metal atom, an ammonium group, or an organic amine group.

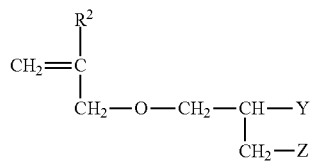

Formula (R2)

In Formula (R2), $R^2$ represents a hydrogen atom or a methyl group, and Y and Z each independently represent a hydroxy group or a sulfonic acid group (which may be in the form of a monovalent metal salt, a divalent metal salt, an ammonium salt, or an organic amine group salt).

Patent Literature 1 describes that the above copolymer has a significantly improved gel resistance owing to a synergistic effect produced by the sulfonic acid group present in a side chain that is a structural unit derived from a (meth)allyl ether based-monomer and the sulfonic acid group introduced to the end of the main chain.

CITATION LIST

Patent Literature

Patent Literature 1: JP 2002-3536 A

SUMMARY OF INVENTION

Technical Problem

As described above, various polymers have been reported, but these polymers still need to be improved so that they can sufficiently exhibit the performance (gel resistance) for preventing gelation and precipitation even under higher hardness conditions than before. When used as a water treatment agent, for example, the polymers are also required to enhance detergency by preventing the surfactant from being insolubilized by calcium ions or to inhibit scale formation by capturing calcium ions in water. In order to achieve these performances, the polymers need to be modified to maintain the calcium-ion capturing ability at a high level.

In view of this, the present invention aims to provide a copolymer that shows, in the water-system applications described above, a much improved gel resistance as compared to conventional copolymers and also shows high calcium ion chelating ability. The present invention also relates to a method of producing the copolymer.

Solution to Problem

As a result of keen studies on various polymers and copolymers for achieving the above aims, the inventors have found out that a specific (meth)acrylic acid-based copolymer is excellent in gel resistance and chelating ability. Such a finding has led to the completion of the present invention.

Accordingly, the copolymer of the present invention is a (meth)acrylic acid-based copolymer comprising, as essential structural units: 16 mol % or more but 24 mol % or less of a structural unit (a) derived from a monomer represented by Formula (1); and 76 mol % or more but 84 mol % or less of a structural unit (b) derived from (meth)acrylic acid or a salt thereof, each based on 100 mol % of all the structural units derived from monomers, the copolymer comprising a main chain having a sulfonic acid group or a sulfonic acid salt group at at least one end thereof, the copolymer having a weight average molecular weight of 1000 to 18000:

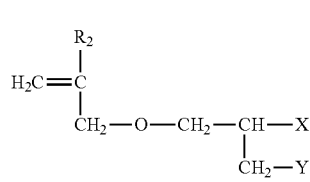

Formula (1)

wherein $R_2$ represents a hydrogen atom or a methyl group; and X and Y each independently represent a hydroxy group, a sulfonic acid group, or a sulfonic acid salt group, at least one of X and Y representing a sulfonic acid group or a sulfonic acid salt group.

Advantageous Effects of Invention

The copolymer of the present invention shows excellent gel resistance and sufficient chelating ability under extremely high hardness conditions. Therefore, the copolymer of the present invention is suitably used in a water treatment agent (especially, a scale inhibitor).

BRIEF DESCRIPTION OF DRAWING

FIG. 1 is a $^1$HNMR chart for polymer (1) obtained in Example 1.

DESCRIPTION OF EMBODIMENTS

The present invention is described in detail below. It is to be noted that a combination of two or more preferable embodiments of the present invention described below is also a preferable embodiment of the present invention.
[(Meth)acrylic acid-based copolymer (hereinafter, also referred to as "copolymer of the present invention")]
The copolymer of the present invention includes, as an essential structural unit, a structural unit (a) derived from a monomer (hereinafter, also referred to as a "monomer A") represented by Formula (1) in a specific proportion.

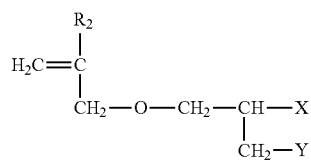

Formula (1)

In Formula (1), $R_2$ represents a hydrogen atom or a methyl group, and X and Y independently represent a hydroxy group or a sulfonic acid (salt) group. (At least one of X and Y represents a sulfonic acid (salt) group.)

The sulfonic acid (salt) herein refers to sulfonic acid or a salt of sulfonic acid.

The salt in the term "salt of sulfonic acid" herein means a metal salt, an ammonium salt, or an organic amine salt. Specific examples thereof include alkali metal salts such as sodium salts, lithium salts, and potassium salts; alkaline earth metal salts such as magnesium salts and calcium salts; transition metal salts such as iron salts; alkanolamine salts such as monoethanolamine salts, diethanolamine salts, and triethanolamine salts; alkylamine salts such as monoethylamine salts, diethylamine salts, and triethylamine salts; and organic amine salts (e.g., polyamines) such as ethylenediamine salts and triethylenediamine salts. Particularly preferred among these are sodium salts and potassium salts of sulfonic acid.

In Formula (1), preferably, either one of X and Y is a sulfonic acid (salt) group.

The structural unit (a) derived from the monomer (A) represented by Formula (1) is specifically represented by Formula (2) below.

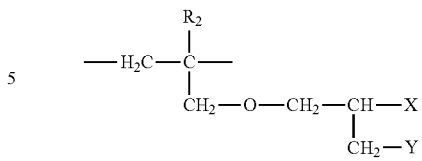

Formula (2)

In Formula (2), $R_2$ represents a hydrogen atom or a methyl group, and X and Y each independently represent a hydroxy group or a sulfonic acid (salt) group. (At least one of X and Y represents a sulfonic acid (salt) group.)

The phrase "the copolymer of the present invention includes a 'structural unit (a) derived from the monomer (A) represented by Formula (1)'" means that the resulting copolymer includes the structural unit represented by Formula (2).

Since containing a specific amount of the structural unit (a) derived from the monomer (A) represented by Formula (1), the copolymer of the present invention has a markedly improved gel resistance. The structural unit (a) derived from the monomer (A) represented by Formula (1) is free from an ester group and an amido group and therefore highly stable under conditions of the process for producing the copolymer of the present invention, as well as under conditions of processes for producing various products that contain the copolymer of the present invention. This allows efficient improvement in gel resistance.

The copolymer of the present invention includes the structural unit (a) derived from the monomer (A) represented by Formula (1) in a proportion of 16 mol % or more but 24 mol % or less based on 100 mol % of all the structural units derived from monomers. The phrase "all the structural units derived from monomers" herein means the structural unit (a) derived from the monomer (A) represented by Formula (1), a structural unit (b) derived from (meth)acrylic acid (salt), and structural unit(s) (c) derived from other monomer(s). If the proportion of the structural unit (a) derived from the monomer (A) represented by Formula (1) is within the above range, the copolymer of the present invention tends to have good gel resistance and good chelating ability. In addition, the structural unit (b) derived from (meth)acrylic acid (salt) contains a carboxy group with a certain level of efficiency, thereby contributing to good chelating ability. The proportion of the structural unit (a) derived from the monomer (A) represented by Formula (1) is more preferably 17 mol % or more but 22 mol % or less, even more preferably 17 mol % or more but 21 mol % or less, and particularly preferably 18 mol % or more but 20 mol % or less, based on 100 mol % of all the structural units derived from monomers.

<Structural Unit Derived from (Meth)Acrylic Acid (Salt)>

The copolymer of the present invention includes, as an essential structural unit, a structural unit (b) derived from (meth)acrylic acid (salt) (hereinafter, also referred to as a "monomer (B)") in a specific proportion.

The (meth)acrylic acid (salt) herein refers to acrylic acid, a salt of acrylic acid, methacrylic acid, or a salt of methacrylic acid. Examples of the salt in the term "salt of (meth)acrylic acid" includes the salts described above with regard to the salt in the term "salt of sulfonic acid." Particularly preferred (meth)acrylic acid salts are sodium salts of (meth)acrylic acid and potassium salts of (meth)acrylic acid.

The structural unit (b) derived from (meth)acrylic acid (salt) has a structure obtainable by substituting an unsaturated double bond of (meth)acrylic acid (salt) with a single bond. For example, if the (meth)acrylic acid (salt) is sodium acrylate, the structural unit (b) is represented by —CH$_2$—CH(COONa)—. The phrase "the copolymer of the present invention includes a 'structural unit (b) derived from (meth)acrylic acid (salt)'" herein means that the resulting copolymer includes a structural unit obtainable by substituting an unsaturated double bond of (meth)acrylic acid (salt) with a single bond.

The copolymer of the present invention includes, as an essential structural unit, the structural unit (b) derived from (meth)acrylic acid (salt) in a proportion of 76 mol % or more but 84 mol % or less based on 100 mol % of all the structural units derived from monomers. The phrase "all the structural units derived from monomers" herein means, as described above, the structural unit (a) derived from the monomer (A) represented by Formula (1), the structural unit (b) derived from (meth)acrylic acid (salt), and structural unit(s) (c) derived from other monomer(s).

If the proportion of the structural unit (b) derived from (meth)acrylic acid (salt) is within the above range, the copolymer of the present invention tends to be excellent in gel resistance and chelating ability. The proportion of the structural unit (b) derived from (meth)acrylic acid (salt) is preferably 78 mol % or more but 83 mol % or less, even more preferably 79 mol % or more but 83 mol % or less, and particularly preferably 80 mol % or more but 82 mol % or less, based on 100 mol % of all the structural units derived from monomers. If the proportion of the structural unit (b) derived from (meth)acrylic acid (salt) is less than 76 mol %, the copolymer tends to have lowered chelating ability.

<Structural Units Derived from Other Monomers>

The copolymer of the present invention may further include, in addition to the structural unit (a) derived from the monomer (A) represented by Formula (1) and the structural unit (b) derived from (meth)acrylic acid (salt), a structural unit (c) derived from other monomers (hereinafter, also referred as a "monomer (C)").

The monomer (C) is preferably a monomer copolymerizable with the monomer (A) represented by Formula (1) and/or (meth)acrylic acid (salt).

The monomer (C) may be a salt. In this case, examples of the salt include the salts described above with regard to the salt in the term "salt of sulfonic acid." The salt as the monomer (C) is particularly preferably a sodium salt or a potassium salt.

The structural unit (c) derived from the monomer (C) has a structure obtainable by substituting an unsaturated double bond of a monomer other than the monomer (A) and (meth)acrylic acid (salt) with a single bond. For example, if the monomer (C) is methyl acrylate, the structural unit (c) derived from the monomer (C) is represented by —CH$_2$—CH(COOCH$_3$)—.

The phrase "the copolymer of the present invention has a 'structural unit (c) derived from the monomer (C)'" herein means that the resulting copolymer of the present invention includes a structural unit obtainable by substituting an unsaturated double bond involved in the copolymerization reaction of the monomer (C) with a single bond.

The copolymer of the present invention may contain the structural unit (c) derived from the monomer (C) in a proportion of 0 mol % or more but 8 mol % or less based on 100 mol % of all the structural units derived from monomers. The term "all the structural units derived from monomers" herein is as described above. It is not preferred that the proportion of the structural unit (c) derived from the monomer (C) exceeds the above range because, in this case, the gel resistance and the chelating ability are disadvantageously lowered. The proportion of the structural unit (c) is preferably 0 mol % or more but 6 mol % or less, even more preferably 0 mol % or more but 4 mol % or less, and particularly preferably 0 mol % or more but 2 mol % or less, based on 100 mol % of all the structural units derived from monomers.

The monomer (C) is not particularly limited and appropriately selected depending on the desired effects. Specific examples of the monomer (C) include unsaturated monocarboxylic acids other than the monomer (B) and salts thereof such as crotonic acid, α-hydroxyacrylic acid, α-hydroxymethylacrylic acid, and derivatives thereof; unsaturated dicarboxylic acids such as itaconic acid, fumaric acid, maleic acid, and 2-methyleneglutaric acid, and salts thereof; sulfonic acid group-containing monomers other than the monomer (A) such as vinyl sulfonic acid, 1-acrylamido-1-propanesulfonic acid, 2-acrylamido-2-propanesulfonic acid, 2-(meth)acrylamido-2-methyl-1-propanesulfonic acid, (meth)allyloxybenzenesulfonic acid, styrene sulfonic acid, sulfoethyl (meth)acrylate, sulfopropyl (meth)acrylate, (meth)allyl sulfonic acid, isoprene sulfonic acid, and salts thereof; polyalkylene glycol chain-containing monomers such as monomers obtainable by adding an alkylene oxide to (meth)allyl alcohol or isoprenol and (meth)acrylates of alkoxy alkylene glycols; N-vinyl monomers such as N-vinylpyrolidone, N-vinylformamide, N-vinylacetamide, N-vinyl-N-methylformamide, N-vinyl-N-methylacetamide, and N-vinyloxazolidone; amide monomers such as (meth)acrylamide, N,N-dimethylacrylamide, and N-isopropylacrylamide; allyl ether monomers such as (meth)allyl alcohol; isoprene monomers such as isoprenol; alkyl (meth)acrylate monomers such as butyl (meth)acrylate, 2-ethylhexyl (meth)acrylate, and dodecyl (meth)acrylate; hydroxyalkyl (meth)acrylates monomers such as 2-hydroxyethyl (meth)acrylate, 2-hydroxypropyl (meth)acrylate, 2-hydroxybutyl (meth)acrylate, 4-hydroxybutyl (meth)acrylate, and 2-hydroxyhexyl (meth)acrylate; vinyl aryl monomers such as styrene, indene, and vinyl aniline; isobutylene, vinyl acetate; vinylaromatic amino-group containing monomers having a heterocyclic aromatic hydrocarbon group (e.g., vinyl pyridine, vinyl imidazole) and an amino group, quaternization products thereof, and salts thereof; aminoalkyl (meth)acrylates such as dimethylaminoethyl acrylate, dimethylaminoethyl methacrylate, dimethylaminopropyl acrylate, and aminoethyl methacrylate, quaternization products thereof, and salts thereof; allylamines such as diallylamine and diallyldimethylamine, quaternization products thereof, and salt thereof; and monomers obtainable by reacting (i) an epoxy ring such as (meth)allyl glycidyl ether, isoprenyl glycidyl ether, or vinyl glycidyl ether with (ii) an amine such as a dialkyl amine (e.g., dimethylamine, diethylamine, diisopropylamine, di-n-butylamine), an alkanolamine (e.g., diethanolamine, diisopropanolamine), an aminocarboxylic acid (e.g., iminodiacetic acid, glycine), or a cyclic amine (e.g., morpholine, pyrrole), quaternization products thereof, and salts thereof.

For the monomers (C), one species thereof may be used alone or two or more species thereof may be used in combination.

<Structure of End of Main Chain of Copolymer>

The copolymer of the present invention characteristically includes a main chain having a sulfonic acid (salt) group at at least one end thereof. The main chain of the copolymer of the present invention herein means a chain portion formed by polymerization of unsaturated bonds of monomers. One example of the main chain is a chain portion formed by polymerization of a double bond of the monomer (A) represented by Formula (1) and a double bond of (meth) acrylic acid (salt). The phrase "the copolymer of the present invention includes a main chain having a sulfonic acid (salt) group at at least one end thereof" herein means that the copolymer has a sulfonic acid (salt) group at one or two or more ends of the main chain. In a preferred preparation example described below, the copolymer of the present invention is produced using a bisulfurous acid (salt). In such a mode, the copolymer has a sulfonic acid (salt) group at one end of the main chain. The copolymer of the present invention is not limited thereto. For example, if the copolymer comprises a straight chain copolymer molecule, the copolymer may have a sulfonic acid (salt) group at two ends of the main chain. If the copolymer comprises a branched copolymer molecule, the copolymer may have a sulfonic acid (salt) group at three or more ends of the main chain. The copolymer of the present invention may comprise, in a mixed manner, a copolymer that has a sulfonic acid (salt) group at one end of the main chain and a copolymer that has a sulfonic acid (salt) group at two or more ends of the main chain. Alternatively, the copolymer of the present invention may comprise, in a mixed manner, a copolymer that has a sulfonic acid (salt) group at at least one end of the main chain and a copolymer that has no sulfonic acid (salt) group at any end of the main chain. If a sulfonic acid group is present at at least one end of the main chain of the copolymer, the copolymer of the present invention has an improved gel resistance. The proportion (% by mass) of the sulfonic acid (salt) group present at the ends of the main chain of the copolymer of the present invention is preferably 0.01% by mass or more but 5% by mass or less based on 100% by mass of the total mass of the copolymer of the present invention. The preferred proportion varies depending on such factors as the mode of bonding of the sulfonic acid (salt) group to an end of the main chain of the copolymer as described above or the weight average molecular weight. The above proportion range is suitable especially if the weight average molecular weight is within the below-mentioned preferred range.

The proportion (% by mass) of the sulfonic acid (salt) group based on the total mass of the copolymer of the present invention herein is calculated in acid equivalent.

As for the method of forming a structural unit that contains a sulfonic acid (salt) group at an end of the main chain of the copolymer, the monomers (A) and (B) are preferably copolymerized in the presence of a bisulfurous acid (salt) (which herein refers to sulfurous acid, bisulfurous acid, dithionous acid, metabisulfurous acid, or a salt thereof). In this case, the bisulfurous acid (salt) serves as a chain transfer agent, for example, to allow the sulfonic acid (salt) group to be taken in the copolymer molecule.

The sulfonic acid (salt) group present at an end of the main chain of the copolymer can be confirmed by, for example, $^1$HNMR.

<Molecular Weight of (Meth)Acrylic Acid-Based Copolymer>

The copolymer of the present invention has a weight average molecular weight (Mw) of 1000 to 18000. The weight average molecular weight of the present invention is preferably 5000 to 15000, and more preferably 7000 to 12000. If the weight average molecular weight is within this range, the copolymer of the present invention tends to have an improved gel resistance under high hardness conditions and therefore can be more suitably used in scale inhibitors or the like application. If the copolymer has a weight average molecular weight of smaller than 1000, gel resistance tends to decrease because of an increase in the proportion of the copolymer free from the structural unit (a) derived from the monomer (A) represented by Formula (1). The weight average molecular weight of the present invention is more preferably 7000 or greater from the viewpoint of a significant improvement in calcium ion-capturing ability.

The copolymer of the present invention preferably has a degree of dispersion (weight average molecular weight (Mw)/number average molecular weight (Mn)) of 1.5 to 10.0, more preferably 1.8 to 8.0, and even more preferably 2.0 to 6.0. If the copolymer has a degree of dispersion of smaller than 1.5, the synthesis of the copolymer is troublesome. If the copolymer has a degree of dispersion of greater than 10.0, the copolymer tends to have deteriorated performances because of reduction in the amounts of components advantageous for performances.

The weight average molecular weight (Mw) and the number average molecular weight (Mn) can be determined by gel permeation chromatography described in EXAMPLES below.

<Gel Resistance of Copolymer>

The gel resistance in the present invention is evaluated by the following gel resistance test.

(Gel resistance test)

Pure water, a boric acid-sodium borate pH buffer, an aqueous solution of a copolymer, and a calcium chloride solution are charged in sequence to a 300-mL tall beaker to prepare a test liquid that contains the copolymer at a solids concentration of 100 mg/L and has a calcium concentration of 10000 mgCaCO$_3$/L and a pH of 8.5. Thereafter, the beaker is sealed with a polyvinylidene chloride film and left to stand in a constant-temperature bath at 90° C. for one hour. The gel resistance is evaluated by checking the presence or absence of precipitation. If precipitation occurs, gel resistance is regarded to be significantly low. If no precipitation occurs, the test liquid is stirred and then placed into a quartz cell (light path length: 5 cm) and the absorbance (a) at a UV wavelength of 380 nm is measured with a spectral photometer (U-2800A model from Hitachi, Ltd.). Separately, a blank is prepared using a test liquid prepared from the above components excluding the calcium chloride solution and subjected to the same operations. Thereby, the absorbance (b) was measured. The degree of gelation is calculated according to the following equation.

$$\text{Degree of gelation}=(a)-(b)$$

A smaller degree of gelation indicates a higher gel resistance.

With regard to the gel resistance of the copolymer of the present invention, the degree of gelation is preferably smaller than 0.040. With a degree of gelation within this range, the copolymer can be suitably used as a water treatment agent or the like additive even under high hardness conditions. The degree of gelation is more preferably smaller than 0.030.

<Calcium Ion-Capturing Ability of Copolymer>

The copolymer of the present invention exhibits good calcium ion-capturing ability.

The calcium ion-capturing ability (mgCaCO$_3$/g) herein is defined as the amount of calcium ions captured by 1 g of a water-soluble polymer and expressed in the number of mg of calcium carbonate equivalent. The calcium ion-capturing ability is an index indicating how much calcium ions in water the water-soluble polymer captures. Specifically, when a water-soluble polymer having a high calcium ion-capturing ability is added to a water treatment agent, the polymer captures calcium ions in water and is adsorbed to crystal cores which cause scales, thereby inhibiting generation or development of scales.

The calcium ion-capturing ability herein is measured by the following method.

(Method of Measuring Calcium Ion-Capturing Ability)

A 0.001 mol/L aqueous calcium chloride solution (50 g) is sampled into a 100-cc beaker, and the solution is mixed with a water-soluble polymer (10 mg in solids equivalent). Subsequently, the pH of the aqueous solution is adjusted to 9 to 11 with dilute sodium hydroxide. Thereafter, a 4 mol/L aqueous potassium chloride solution (1 ml) as a stabilizer for a calcium ion electrode is added to the aqueous solution under stirring. The amount of free calcium ions is measured with an ion analyzer (model EA920 from Orion Corporation.) and a calcium ion electrode (model 93-20 from Orion Corporation), and the number of mg of calcium ions (in calcium carbonate equivalent) chelated per g of the water-soluble polymer, that is, calcium ion-capturing ability, which is a kind of chelating ability, is calculated. The calcium ion-capturing ability is expressed in "mgCaCO$_3$/g."

The copolymer of the present invention preferably has a calcium ion-capturing ability of 170 mgCaCO$_3$/g or more. With a calcium ion-capturing ability within this range, the copolymer can be suitably used as a water treatment agent or the like additive. The calcium ion-capturing ability is more preferably 190 mgCaCO$_3$/g or more, and even more preferably 200 mgCaCO$_3$/g or more. The upper limit of the calcium ion-capturing ability is not particularly limited, and may be 500 mgCaCO$_3$/g or less, for example.

[Method of Producing (Meth)Acrylic Acid-Based Copolymer]

The (meth)acrylic acid-based copolymer of the present invention is preferably produced by a method in which monomer components including the monomer represented by Formula (1) and (meth)acrylic acid (salt) are copolymerized such that a sulfonic acid (salt) group be bonded to an end of the main chain of the resulting copolymer. Preferred embodiments of such a method include a method in which 16 mol % or more but 24 mol % or less of a monomer represented by Formula (1) and 76 mol % or more but 84 mol % or less of (meth)acrylic acid (salt) as essential components, each based on 100 mol % of all the monomers, are copolymerized in the presence of a bisulfurous acid (salt).

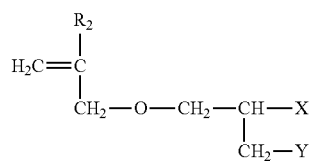

Formula (1)

In Formula (1), R$_2$ represents a hydrogen atom or a methyl group; and X and Y each independently represent a hydroxy group or a sulfonic acid (salt) group. (At least one of X and Y represents a sulfonic acid (salt) group.)

<Monomer Composition>

The method of producing the copolymer of the present invention includes copolymerizing 16 mol % or more but 24 mol % or less of the monomer (A) represented by Formula (1) and 76 mol % or more but 84 mol % or less of (meth)acrylic acid (salt) (monomer (B)) as essential components, each based on 100 mol % of the amount of all the monomers (the sum of the monomers (A), (B) and (C)).

If the proportion of the monomer (A) is 24 mol % or less, the amount of the monomer (A) that remains after the completion of copolymerization can be reduced. This improves the gel resistance of the below-described copolymer composition that contains the copolymer of the present invention.

In the method of producing the copolymer of the present invention, for each of the monomers (A) and (B), one species may be used or two or more species may be used in combination. In the method of the producing the copolymer of the present invention, optionally the monomer (C) may be further copolymerized, in addition to the monomers (A) and (B).

The proportion of the monomer (C) in the method of producing the copolymer of the present invention is preferably 0 mol % or more but 8 mol % or less based on 100 mol % of the amount of all the monomers (the sum of the monomers (A), (B), and (C)). If the monomer (C), an optional component, is used, one species may be used or two or more species may be used in combination.

In the method of producing the copolymer of the present invention, from the viewpoint of more favorable gel resistance and calcium-ion capturing ability of the resulting copolymer of the present invention, the proportions of the monomers are more preferably as follows: the proportion of the monomer (A) is 17 mol % or more but 22 mol % or less; that of the monomer (B) is 78 mol % or more but 83 mol % or less; and that of the monomer (C) is 0 to 6 mol % or less, based on 100 mol % of the amount of all the monomers. Even more preferably, the proportion of the monomer (A) is 17 mol % or more but 21 mol % or less, that of the monomer (B) is 79 mol % or more but 83 mol % or less, and that of the monomer (C) is 0 to 4 mol %. Particularly preferably, the proportion of the monomer (A) is 18 mol % or more but 20 mol % or less, that of the monomer (B) is 80 mol % or more but 82 mol % or less, and that of the monomer (C) is 0 to 2 mol %. The sum of the monomers (A), (B), and (C) is 100 mol %.

In one preferred embodiment of the method of producing the copolymer of the present invention, it is essential that the monomers (A) and (B) are copolymerized in the presence of a bisulfurous acid (salt).

If the monomers (A) and (B) are copolymerized in the presence of a bisulfurous acid (salt), a sulfonic acid (salt) is introduced to an end of the main chain of the resulting copolymer.

The bisulfurous acid (salt) generally serves as a chain transfer agent. Bisulfurous acids (salts) include, for example, sulfurous acid, bisulfurous acid, dithionous acid, metabisulfurous acid, and salts thereof. Specific examples thereof include sodium bisulfite, potassium bisulfite, sodium dithionite, potassium dithionite, sodium metabisulfite, potassium metabisulfite, and ammonium bisulfite. If a sulfonic acid (salt) is introduced to an end of the main chain of the copolymer, the below-mentioned copolymer composition containing the copolymer of the present invention has an improved gel resistance.

In one preferred embodiment of the method of producing the copolymer of the present invention, the proportion of the bisulfurous acid (salt) is preferably 1 to 20 g, and more preferably 2 to 15 g based on 1 mol of the amount of all the monomers (including the monomers (A), (B), and optionally the monomer (C)).

The bisulfurous acid (salt) can improve the color hue of the resulting copolymer (composition).

<Initiator>

In the method of producing the copolymer of the present invention, the monomers (A), (B), and (C) (hereinafter, also referred to as "monomer composition") are preferably copolymerized in the presence of an initiator.

The initiator may be any known initiator, and suitable examples thereof include: hydrogen peroxide; persulfates such as sodium persulfate, potassium persulfate, and ammonium persulfate; azo compounds such as 2,2'-azobis(isobutyroinitrile) and 2,2'-azobis(2-methylpropionamidine)dihydrochloride; and organic peroxides such as benzoyl peroxide, lauroyl peroxide, peracetic acid, di-t-butyl peroxide, and cumene hydroperoxide. Preferred among these initiators are persulfates, as described below, because these tend to improve the gel resistance of the resulting copolymer.

The amount of the initiator is not particularly limited provided that the amount is enough to initiate the copolymerization of the monomers (A), (B), and optionally the monomer (C). Except as described later, the amount of the initiator is preferably 15 g or less and more preferably 1 to 12 g based on 1 mol of the amount of all the monomers (including the monomers (A) and (B) and optionally the monomer (C)).

<Other Chain Transfer Agents>

In the method of producing the copolymer of the present invention, a chain transfer agent other than the bisulfurous acid (salt) (hereinafter, also referred to as "other chain transfer agent(s)") may be optionally used as a copolymer molecular weight modifier to the extent that the copolymerization is not adversely affected. Specific examples of other chain transfer agents include: thiol chain transfer agents such as mercaptoethanol and 3-mercaptopropionic acid; halogenated compounds such as carbon tetrachloride, methylene chloride, bromoform, and bromotrichloroethane; secondary alcohols such as isopropanol and glycerin; and low-grade oxides and salts thereof such as phosphorous acid, hypophosphorous acid, and salts thereof (e.g., sodium hypophosphite, potassium hypophosphite). For other chain transfer agent(s), one species may be used alone, or two or more species may be used in admixture. If it is not necessary to distinguish between the bisulfurous acid (salt) and other chain transfer agents, they are collectively referred to as chain transfer agents hereinbelow.

The chain transfer agent advantageously inhibits an excessive increase in the weight average molecular weight of the resulting copolymer and enables efficient production of a copolymer with a low weight average molecular weight.

In the method of producing the copolymer of the present invention, the amount of the chain transfer agent is not particularly limited provided that the amount is enough to favorably perform the copolymerization of the monomers (A) and (B) and optionally the monomer (C).

Except as specifically described later, the total amount of the bisulfurous acid (salt) and other chain transfer agent(s) is preferably 1 to 20 g and more preferably 2 to 15 g based on 1 mol of the amount of all the monomers (including the monomers (A) and (B) and optionally the monomer (C)).

<Preferable Combination (Hereinafter, Also Referred as Initiator System) of Initiator and Bisulfurous Acid (Salt)>

In the method of producing the copolymer of the present invention, one or more persulfates and one or more bisulfurous acids (salts) are preferably used in combination as an initiator system. This allows a sulfonic acid (salt) group to be efficiently introduced to an end of the main chain of the copolymer. As a result, the resulting copolymer can be excellent not only in dispersibility and chelating ability but also in gel resistance and can be low in the weight average molecular weight, thereby effectively exhibiting the effects of the present invention.

Suitable examples of the persulfate in the initiator system include sodium persulfate, potassium persulfate, and ammonium persulfate.

Suitable examples of the bisulfurous acid (salt) in the initiator system include sodium bisulfite, potassium bisulfite, and ammonium bisulfite.

If the persulfate and the bisulfurous acid (salt) are used in combination, the proportion of the bisulfurous acid (salt) is preferably 0.1 to 5 parts by mass, more preferably 0.2 to 3 parts by mass, and even more preferably 0.2 to 2 parts by mass, relative to 1 part by mass of the persulfate. If the proportion of the bisulfurous acid (salt) is less than 0.1 parts by mass relative to 1 part by mass of the persulfate, the effect of the bisulfurous acid (salt) tends to be smaller. This reduces the amount of sulfonic acid (salt) group introduced to the end of the main chain of the copolymer, and thereby tends to cause reduction in gel resistance and increase in the weight average molecular weight of the resulting copolymer. If the proportion of the bisulfurous acid (salt) is more than 5 parts by mass relative to 1 part by mass of the persulfate, effects commensurate with the proportion of bisulfurous acid (salt) used is not produced, which tends to result in an excessive supply (waste) of the bisulfurous acid (salt). In this case, an excessive amount of bisulfurous acid (salt) is decomposed in the copolymerization system, generating a large amount of sulfurous acid gas ($SO_2$ gas). Moreover, a large amount of impurities are produced in the copolymer, and thereby the resulting copolymer tends to have deteriorated performances. Further, when the copolymer is kept at low temperatures, impurities are more likely to precipitate.

If the persulfate and the bisulfurous acid (salt) are used, the total amount of the persulfate and the bisulfurous acid (salt) is preferably 2 to 20 g, more preferably 2 to 15 g, even more preferably 3 to 10 g, and particularly preferably 4 to 9 g, based on 1 mol of the amount of all the monomers. If the total amount of the persulfate and the bisulfurous acid (salt) is less than 2 g, the resulting copolymer tends to have an increased weight average molecular weight. Further, a reduced amount of a sulfonic acid (salt) group tends to be introduced to the end of the main chain of the resulting copolymer. If the total amount of the persulfate and the bisulfurous acid (salt) is more than 20 g, effects of the persulfate and the bisulfurous acid (salt) tend not to be commensurate with the amount used. On the contrary, the resulting copolymer disadvantageously tends to have reduced purity.

The persulfate may be dissolved in a below-described solvent, preferably in water, and thus may be used in the form of a persulfate solution (preferably an aqueous solution of a persulfate). The persulfate solution (preferably aqueous solution) preferably has a concentration of 1 to 35% by mass, more preferably 5 to 35% by mass, and even more preferably 10 to 30% by mass. If the persulfate solution has a concentration of lower than 1% by mass, the resulting copolymer has a reduced concentration, making the transportation and the storage of the copolymer troublesome. If the persulfate solution has a concentration of higher than 35% by mass, the solution is difficult to handle.

The bisulfurous acid (salt) may be dissolved in a below-described solvent, preferably in water, and thus may be used in the form of a bisulfurous acid (salt) solution (preferably an aqueous solution of a bisulfurous acid (salt)). The bisulfurous acid (salt) solution (preferably aqueous solution) preferably has a concentration of 10 to 42% by mass, more preferably 20 to 42% by mass, and even more preferably 32 to 42% by mass. If the bisulfurous acid (salt) solution has a concentration of lower than 10% by mass, the resulting copolymer has a reduced concentration, making the transportation and the storage of the copolymer troublesome. If the bisulfurous acid (salt) solution has a concentration of higher than 42% by mass, the solution is difficult to handle.

<Other Additives>

In the method of producing the copolymer of the present invention, additives other than the initiator and the chain transfer agent can be used in the copolymerization system upon copolymerization of the monomers in the aqueous solution. Any appropriate additives can be used in appropriate amounts to the extent that the additives do not adversely affect the effects of the copolymer of the present invention. Examples of such other additives include heavy metal concentration adjusters and pH adjusters.

The heavy metal concentration adjuster is not particularly limited, and may be a polyvalent metal compound or an elemental substance. Specific examples thereof include: polyvalent metal oxides such as vanadium sulfate, copper (II) hydroxide, and ammonium ferric sulfate; copper powder, and iron powder.

In the method of producing the copolymer of the present invention, the solution containing the resulting copolymer preferably has a heavy metal ion concentration of 0.05 to 10 ppm. Therefore, it is preferable that the heavy metal concentration adjuster is used as necessary in an appropriate amount.

<Copolymerization Solvent>

In the method of producing the copolymer of the present invention, typically, the monomers are copolymerized in a solvent. The solvent used in the copolymerization system in this case is preferably an aqueous solvent such as water, an alcohol, glycol, glycerin, or polyethylene glycol, and particularly preferably water. These solvents may be used alone, or in combination of two or more thereof. In order to improve the solubility of the monomers in the solvent, an organic solvent may be appropriately used to the extent that the copolymerization of the monomers is not adversely affected.

Specifically, the organic solvent may be one or two or more appropriately selected from lower alcohols such as methanol and ethanol; amides such as dimethylformaldehyde; ethers such as diethyl ether and dioxane, and the like.

The amount of the solvent is preferably 40 to 200% by mass, more preferably 45 to 180% by mass, and even more preferably 50 to 150% by mass based on 100% by mass of the monomers. If the amount of the solvent is less than 40% by mass, the resulting copolymer has an increased weight average molecular weight. If the amount of the solvent is more than 200% by mass, the resulting copolymer has a reduced concentration and may require solvent elimination. A large part or all of the solvent may be fed to a reaction vessel at the beginning of the copolymerization, but, for example, part of the solvent alone may be appropriately added (dropped) to the reaction system during the copolymerization. Alternatively, the monomers, the bisulfurous acid (salt), the initiator, and other additives may preliminarily be dissolved in the solvent, and the solvent together with these components may appropriately added (dropped) to the reaction system.

<Copolymerization Temperature>

The monomers may be copolymerized at any temperature. The copolymerization temperature is preferably 50° C. or higher, and more preferably 70° C. or higher, and also preferably 99° C. or lower, more preferably 95° C. or lower, and even more preferably 90° C. or lower because the copolymer can be efficiently produced if the temperature is within this range. If the copolymerization temperature is lower than 50° C., the resulting copolymer has an increased weight average molecular weight and also contains an increased amount of impurities. Further, if the copolymerization temperature is less than 50° C., the copolymerization takes too much time, leading to reduction in productivity. A copolymerization temperature of 99° C. or lower can inhibit decomposition of the bisulfurous acid (salt) and the resulting generations of a large amount of sulfurous acid gas. The copolymerization temperature herein refers to a reaction solution temperature in the reaction system. If the copolymerization temperature is 50° C. or higher but 99° C. or lower, the amount of unreacted (meth)allyl ether-based monomer tends to decrease.

Especially if the copolymerization is started from room temperature (a room temperature starting method), the heating-up time is set as follows. If the copolymerization takes, for example, 180 minutes per batch (180 minutes formulation), the copolymerization temperature is raised such that the temperature should reach the set temperature (within the copolymerization temperature range specified above, preferably 70° C. to 90° C., and more preferably about 80° C. to 90° C.) preferably within 70 minutes, more preferably within 50 minutes, and even more preferably within 30 minutes. Thereafter, the set temperature is preferably maintained until the copolymerization is completed. If the heating-up time is out of this range, the resulting copolymer may have an increased weight average molecular weight. In this example, the copolymerization time is 180 minutes. If a different copolymerization time is employed, the heating-up time is preferably set with reference to this example such that the proportion of the heating-up time to the copolymerization time should be the same as that in this example.

<Pressure in Reaction System, Reaction Atmosphere>

The monomers may be copolymerized at any pressure condition in the reaction system. The copolymerization may be carried out under normal pressure (atmospheric pressure), under reduced pressure, or under pressure. The copolymerization is preferably carried out under normal pressure or under pressure in a sealed reaction system in order to prevent emission of sulfurous acid gas from the bisulfurous acid (salt) during the copolymerization and to reduce the weight average molecular weight of the resulting copolymer. In addition, copolymerization under normal pressure (atmospheric pressure) eliminates the need for installing a pressure device or a decompression device and the need for pressure-resistant container or pipes. Thus, from the viewpoint of production cost, normal pressure (atmospheric pressure) is preferred. In other words, the pressure condition can be appropriately and optimally set depending on applications of the resulting copolymer.

The atmosphere in the reaction system may be air atmosphere, and preferably an inert atmosphere. For example, the air inside the system is preferably purged with an inert gas such as nitrogen gas before starting the copolymerization. This prevents the atmospheric gas (e.g., oxygen gas) in the reaction system from dissolving in liquid phase and serving as a polymerization inhibitor, thereby preventing deactivation of the initiator (e.g., persulfates) and reduction in the amount thereof, and further reduces the weight average molecular weight of the copolymer.

<Degree of Neutralization During Copolymerization>

In the method of producing the copolymer of the present invention, the copolymerization reaction of the monomers is preferably carried out under acidic conditions. The copolymerization under acidic conditions can suppress an increase in viscosity of the aqueous solution in the reaction system, thereby favorably producing a copolymer with a low weight average molecular weight. Further, under acidic conditions, the copolymerization reaction can proceed at a higher concentration condition than before, which greatly increases the production efficiency. Especially if the degree of neutralization of carboxylic acid during the copolymerization is as low as 0 to 25 mol %, the effect of preventing deactivation of the initiator and reduction in the amount thereof is synergistically enhanced, and thereby the effect of reducing the amount of impurities can be significantly improved. In addition, the pH of the reaction solution at 25° C. during the copolymerization is preferably adjusted to 1 to 6. Such acidic conditions enable one-step copolymerization at a high concentration. As a result, a concentration step, which is required in conventional production methods in some cases, can be omitted. This greatly improves productivity of the resulting copolymer and also can suppress an increase in production cost.

Regarding the acidic conditions, the pH of the reaction solution during the copolymerization at 25° C. is 1 to 6, preferably 1 to 5, more preferably 1 to 4. If the pH is smaller than 1, sulfurous acid gas is generated from the bisulfurous acid (salt), possibly causing corrosion of devices. If the pH is greater than 6, the effect of the bisulfurous acid (salt) is reduced and the resulting copolymer has an increased weight average molecular weight.

The pH of the reaction solution during the copolymerization may be adjusted using a pH adjuster, including: alkali metal hydroxides such as sodium hydroxide and potassium hydroxide; alkaline earth metal hydroxides such as calcium hydroxide and magnesium hydroxide; and salts of organic amines such as ammonia, monoethanolamine, and triethanolamine. These may be used alone or in combination of two or more thereof. Preferred among these are alkali metal hydroxides such as sodium hydroxide and potassium hydroxide, with sodium hydroxide being particularly preferred. In the method of producing the copolymer of the present invention, these compounds may be simply referred to as "pH adjuster" or "neutralizing agent."

The degree of neutralization of a carboxylic acid during the copolymerization is preferably 0 to 25 mol %, and more preferably 1 to 15 mol %, and even more preferably 2 to 10 mol %. If the degree of neutralization of a carboxylic acid during the copolymerization is within this range, the following advantages are provided: the copolymerization most favorably takes place, thus reducing the amount of impurities and producing a copolymer with a good gel resistance; an increase in viscosity of the aqueous solution in the copolymerization system is prevented, enabling favorable production of a copolymer having a low weight average molecular weight; and the copolymerization can proceed under a higher concentration condition than before, thereby greatly increasing production efficiency. In contrast, if the degree of neutralization of a carboxylic acid is greater than 25 mol %, the following disadvantages are provided: the chain transfer efficiency of the bisulfurous acid (salt) decreases, which may increase the weight average molecular weight of the copolymer; the aqueous solution in the copolymerization reaction system undergoes a significant increase in viscosity as the copolymerization proceeds, thereby excessively increasing the weight average molecular weight of the resulting copolymer and failing to produce a copolymer with a low weight average molecular weight; and the effects produced by reducing the degree of neutralization is insufficient, possibly making it difficult to greatly reduce the amount of impurities.

The method of neutralizing a carboxylic acid herein is not particularly limited. For example, a (meth)acrylic acid salt such as sodium (meth)acrylate may be used as a material. Alternatively, a carboxylic acid may be neutralized using an alkali metal hydroxide (e.g., sodium hydroxide) or the like neutralizing agent during the copolymerization. These methods may be used in combination. The neutralizing agent used in the neutralization of a carboxylic acid may be added in the form of solid, or may be dissolved in an appropriate solution, preferably water, and then added in the form of a solution or an aqueous solution. If the neutralizing agent is used in the form of an aqueous solution, the aqueous solution preferably has a concentration of 10 to 60% by mass, more preferably 20 to 55% by mass, and even more preferably 30 to 50% by mass. If the aqueous solution has a concentration of smaller than 10% by mass, the resulting copolymer has a reduced concentration, making the transport or the storage of the copolymer complicated. If the aqueous solution has a concentration of greater than 60% by mass, precipitation may occur, and the aqueous solution has an increased viscosity. This makes the delivery of the aqueous solution complicated.

<Conditions for Adding Materials>

The copolymerization is preferably performed as follows. Each of the monomers, the initiator, the chain transfer agent, and other additive(s) are preliminarily dissolved in an appropriate solvent (preferably the same solvent as that of a solution which is the target of dropwise addition of the solutions) to prepare monomer solutions, an initiator solution, a chain transfer agent solution, and solution(s) of other additive(s). These solutions are continuously dropped over a predetermined drop time to a (aqueous) solvent in the reaction vessel (the temperature of the solvent may be adjusted to a predetermined temperature, if necessary).

With regard to the aqueous solvent, part of the aqueous solvent may be added later, separately from the initially fed part of the solvent which is preliminarily fed to the vessel in the reaction system. The method of producing the copolymer of the present invention is not limited to these methods. For example, with regard to the dropping method, the solutions may be continuously dropped or intermittently dropped in several steps. Part or all of one or two or more of the monomers may be initially fed (in this case, the part or all of one or two or more of the monomers may be regarded to be dropped simultaneously at the beginning of the copolymerization). The drop rate (drop amount) of the one or two or more of the monomers may be constant (constant amount) from the beginning to the end of the copolymerization, or may vary with time depending on the copolymerization temperature and the like conditions. Not all the drop components need to be dropped in the same manner. The start time or the completion time of the dropping may differ from one component to another, and the drop time may be shortened or extended. Thus, the method of producing the copolymer of the present invention can be appropriately modified to the extent that the effects of the present invention are not impaired. If the components are dropped in the form of solutions, the solutions to be dropped may be heated to a temperature approximately equal to the copolymerization temperature in the reaction system. This suppresses variation of the temperature and facilitates temperature control when the copolymerization temperature needs to be kept constant.

If the bisulfurous acid (salt) is used, the weight average molecular weight of the copolymer at the early stage of the copolymerization greatly affects the final weight average molecular weight. In order to reduce the initial weight average molecular weight, the bisulfurous acid (salt) or a solution thereof is preferably added (dropped) to the reaction system in an amount of 5 to 20% by mass within 60 minutes, preferably 30 minutes, and more preferably within 10 minutes from the beginning of the copolymerization. This is effective especially if the copolymerization is started from room temperature as described below.

The dropping of the bisulfurous acid (salt) or a solution thereof is completed 1 to 30 minutes earlier, preferably 1 to 20 minutes earlier, and more preferably 1 to 15 minutes earlier than the completion of the dropping of the monomers (A) and (B). This reduces the amount of bisulfurous acid (salt) remaining after the completion of the copolymerization, and thereby effectively and efficiently inhibits generation of sulfurous acid gas due to the bisulfurous acid (salt) and formation of impurities. This results in a significant reduction in the amount of impurities produced by dissolution of sulfurous acid gas of the gas phase into the liquid phase after the completion of the copolymerization. Any bisulfurous acid (salt) remaining after the completion of the copolymerization results in formation of impurities, reduction in performance of the copolymer, and precipitation of impurities at low temperatures. Therefore, preferably, the initiator system including the bisulfurous acid (salt) is consumed so that no bisulfurous acid (salt) should remain at the end of the copolymerization.

If the dropping of the bisulfurous acid (salt) (solution) is completed only less than 1 minute earlier than the completion of the dropping of the monomers (A) and (B), the bisulfurous acid (salt) may remain after the completion of the polymerization. Examples of such a case include a case in which the dropping of the bisulfurous acid (salt) or a solution thereof and the dropping of the monomers (A) and (B) are simultaneously completed and a case in which the dropping of the bisulfurous acid (salt) or a solution thereof is completed after the completion of the dropping of the monomers (A) and (B). In these cases, it tends to be difficult to effectively and efficiently suppress generation of sulfurous acid gas and formation of impurities, and the residual initiator system may adversely affect the thermal stability of the resulting copolymer. In contrast, if the dropping of the bisulfurous acid (salt) or a solution thereof is completed more than 30 minutes earlier than the completion of the dropping of the monomers (A) and (B), the bisulfurous acid (salt) or a solution thereof is consumed before the completion of the polymerization, which tends to increase the molecular weight of the resulting copolymer. Further, in this case, the drop rate of the bisulfurous acid (salt) or a solution thereof in the copolymerization is faster than that of the monomers (A) and (B), and therefore a large amount of bisulfurous acid (salt) or a solution thereof is dropped in a short period of time. This tends to increase the amount of impurities and sulfurous acid gas generated during this drop period.

The dropping of the persulfate (solution) is completed 1 to 30 minutes later, preferably 1 to 25 minutes later, and more preferably 1 to 20 later than the completion of the dropping of the monomers (A) and (B). This reduces the amount of monomers remaining after the completion of the copolymerization, thereby significantly reducing the amount of impurities due to the residual monomers.

If the dropping of the persulfate (solution) is completed only less than 1 minutes later than the completion of the dropping of the monomers (A) and (B), the monomer components may remain after the completion of the polymerization. Examples of such a case includes a case in which the dropping of the persulfate (solution) and that of the monomers (A) and (B) are simultaneously completed and a case in which the dropping of the persulfate (solution) is completed earlier than the completion of the dropping of the monomers (A) and (B). In such cases, it tends to be difficult to suppress formation of impurities effectively and efficiently. In contrast, if the dropping of the persulfate (solution) is completed more than 30 minutes later than the completion of the dropping of the monomers (A) and (B), the persulfate or a decomposition product thereof remains after the completion of the copolymerization, possibly causing formation of impurities.

<Copolymerization Time>

In the copolymerization, it is more important to prevent formation of impurities by adjusting the copolymerization temperature low so as to suppress generation of sulfurous acid gas from the bisulfurous acid (salt). In order to achieve this, the total drop time is preferably as long as 150 to 600 minutes, more preferably 160 to 450 minutes, and even more preferably 180 to 300 minutes. If the total drop time is less than 150 minutes, the effects produced by the persulfate solution and the bisulfurous acid (salt) solution as the initiators tend to be deteriorated. This tends to reduce the amount of a sulfur-containing group such as a sulfonic acid (salt) group introduced to the end of the main chain of the resulting copolymer, and thereby tends to increase the weight average molecular weight of the copolymer. Further, such dropping to the reaction system in a short period of time may cause the presence of an excessive amount of bisulfurous acid (salt) in the reaction system. The excessive amount of bisulfurous acid (salt) may be decomposed to generate sulfurous acid gas, which may escape to the outside the system or form impurities. This drawback tends to be improved when the copolymerization temperature and the amount of the initiator used are each within a specific lower range. In contrast, if the total drop time is more than 600 minutes, the sulfurous acid gas is less likely to generate, thereby the resulting copolymer has good performances. However, in this case, the productivity of the copolymer may decrease, and thus the applications of the copolymer may be limited. The total drop time herein means the time from the beginning of the dropping of the first dropping component (not always one component) to the completion of the dropping of the last dropping component (not always one component).

<Copolymerization Concentration>

When the dropping of all the monomers, the initiator, and the chain transfer agent is completed, the aqueous solution preferably has a solids concentration (that is, solid concentration of the monomers for copolymerization) is preferably 35% by mass or higher, more preferably 40 to 70% by mass, and even more preferably 45 to 65% by mass. If the solids concentration is 35% by mass or more at the completion of the copolymerization, the copolymerization can be performed in one stage at a high concentration, thereby efficiently producing a copolymer with a low weight average molecular weight. For example, such a one-stage copolymerization can omit a concentration step, which is required in conventional production methods in some cases, and thereby significantly increases the production efficiency. This greatly improves productivity of the resulting copolymer and thereby suppresses an increase in the production cost.

If the above solids concentration is less than 35% by mass, the productivity of the resulting copolymer may fail to be greatly improved. In this case, for example, the concentration step is difficult to omit.

If the solids concentration is high in the copolymerization reaction system, the viscosity of the reaction solution markedly increases as the copolymerization reaction proceeds. Further, the resulting copolymer tends to have a greatly increased weight average molecular weight. However, the copolymerization reaction performed at an acidic side (pH at 25° C.: 1 to 6, the degree of neutralization of carboxylic acid: 0 to 25 mol %) can suppress the increase in the viscosity of the reaction solution that accompanies the progress of the copolymerization reaction. In this case, even the copolymerization reaction under high concentration conditions can produce a copolymer with a low weight average molecular weight and greatly increase the productivity of the resulting copolymer.

<Aging Step>

In the method of producing the copolymer of the present invention, addition of all the materials may be followed by an aging step for the purpose of increasing the copolymerization rate of the monomers. The aging time is preferably 1 to 120 minutes, more preferably 5 to 90 minutes, and even more preferably 10 to 60 minutes. If the aging time is less than 1 minute, aging is insufficient and therefore the monomers may remain. These residual monomers may form impurities, which may reduce performances. If the aging time is more than 120 minutes, the copolymer solution may be colored.

The temperature of the copolymer solution in the aging step is preferably within the same range as that of the copolymerization temperature. The temperature of the copolymer solution in this step may also be kept at a constant temperature (preferably the temperature at which the dropping is completed) or vary with time during aging.

<Steps after Copolymerization>

In the method of producing the copolymer of the present invention, the copolymerization is preferably performed under acidic conditions, as described above. Thus, after the completion of the copolymerization, the degree of neutralization of carboxylic acid (final degree of neutralization of carboxylic acid) of the resulting copolymer may be adjusted to a predetermined range by appropriate addition of an appropriate alkali component as a post-treatment, if necessary.

The final degree of neutralization varies depending on the applications of the copolymer and thus is not particularly limited.

In particular, if the copolymer is used as an acidic copolymer, the final degree of neutralization of carboxylic acid is preferably 0 to 75 mol %, and more preferably 0 to 70 mol %. If the copolymer is used as an alkali or neutral copolymer, the final degree of neutralization of carboxylic acid is preferably 75 to 100 mol %, and more preferably 85 to 99 mol %. If the copolymer used as a neutral or alkali copolymer has a final degree of neutralization of carboxylic acid of more than 99 mol %, the aqueous solution of the copolymer may be colored.

Representative examples of the alkali components include: alkali metal hydroxides such as sodium hydroxide and potassium hydroxide; alkaline earth metal hydroxides such as calcium hydroxide and magnesium hydroxide; organic amines such as ammonia, monoethanolamine, diethanolamine, and triethanolamine. These alkali components may be used alone, or a mixture of two or more of them may be used.

If the copolymer is used in an acidic state without neutralization as described above, the reaction system is under acidic conditions. In this case, poisonous sulfurous acid gas may remain inside the reaction system or in the atmosphere in the system.

In such a case or in the case of using the copolymer under acidic conditions, preferably, the sulfurous acid gas is decomposed by adding a peroxide (e.g., hydrogen peroxide) or is expelled by introducing (blowing) the air or nitrogen gas.

The amount of the hydrogen peroxide is preferably 0.5 to 20% by mass based on 100% by mass of the amount of the bisulfurous acid (salt) (in acid equivalent).

<Other Production Conditions>

The copolymer of the present invention may be produced by a batch or continuous process.

[Copolymer Composition]

A copolymer composition including the copolymer of the present invention (hereinafter, also referred to as "copolymer composition") includes the copolymer of the present invention as an essential component. The copolymer composition may consist only of the copolymer of the present invention or may further include one or more selected from initiator residues, bisulfurous acid (salt) residues, residual monomers, by-products produced in the copolymerization, and water. The copolymer composition preferably includes 1 to 100% by mass of the copolymer of the present invention based on 100% by mass of the copolymer composition. In one preferred embodiment, the copolymer composition includes 40 to 60% by mass of the copolymer of the present invention and 40 to 60% by mass of water.

The amount of the monomer (A) represented by Formula (1) (generally, the residual amount of the monomer (A) represented by Formula (1)) in the copolymer composition is preferably 10000 ppm or less and more preferably 5000 ppm or less based on the copolymer composition because, if the amount of the monomer (A) is in this range, the copolymer composition tends to have an improved gel resistance under high hardness conditions.

[Applications of Copolymer of the Present Invention and Copolymer Composition]

The copolymer of the present invention (or the copolymer composition) can be used as a water treatment agent (e.g., a scale inhibitor, an anticorrosive agent), a fiber treatment agent, a dispersant, a metal ion sealant, a thickener, a binder, an emulsifier, a skin care agent, a hair care agent, or the like.

<Water Treatment Agent>

The copolymer of the present invention (or the copolymer composition) can be used in a water treatment agent. The water treatment agent may optionally contain other compounding agents such as polyphosphates, phosphonates, anticorrosive agents, slime control agents, and chelating agents.

The water treatment agent is useful for preventing scales in a cooling water circulation system, a boiler water circulation system, a seawater desalination plant, a reverse osmosis membrane treating system, a pulp digester, and a black liquor condensing kettles, for example. The water treatment agent may optionally contain an appropriate water-soluble polymer that does not affect the properties and effects thereof.

<Fiber Treatment Agent>

The copolymer of the present invention (or copolymer composition) can be used in a fiber treatment agent. This fiber treatment agent includes at least one selected from the group consisting of stains, peroxides, and surfactants, and the copolymer of the present invention (or copolymer composition).

The amount of the copolymer of the present invention in the fiber treatment agent is preferably 1 to 100% by mass, and more preferably 5 to 100% by mass based on the amount of the whole fiber treatment agent. The fiber treatment agent may optionally contain an appropriate water-soluble polymer that does not affect the properties and its effects.

The following will describe a compounding example of the fiber treatment agent which is closer to the embodiments. This fiber treatment agent can be used in the process of refinement, dyeing, bleaching, and soaping in the fiber treatment. Examples of the stain, peroxide, and surfactant include those commonly used for fiber treatment agents.

For improvement of the whiteness, color unevenness, and color fastness, for example, the compounding ratio of the at least one selected from the group consisting of a stain, a peroxide, and a surfactant to the copolymer of the present invention is preferably 0.1 to 100 parts by mass relative to 1 part by mass of the polymer of the present invention, in the pure contents of the fiber treatment agent equivalent.

The fiber treatment agent may be used for any appropriate fiber. Examples of the fiber include cellulosic fibers such as cotton and hemp, chemical fibers such as nylon and polyester, animal fibers such as wool and silk thread, semi-synthetic fibers such as rayon, and woven clothes and blended fabrics thereof.

If the fiber treatment agent is used in a refining process, the copolymer of the present invention, an alkali chemical, and a surfactant are preferably blended. If the fiber treatment agent is used in a bleaching process, the copolymer of the present invention, a peroxide, and a silicic acid-based chemical such as sodium silicate as a decomposition inhibitor for an alkaline bleaching agent are preferably blended.

<Inorganic Pigment Dispersant>

The copolymer of the present invention (or copolymer composition) can be used in an inorganic pigment dispersant. The amount of the copolymer of the present invention in the inorganic pigment dispersant is preferably 5 to 100% by mass based on the whole inorganic pigment dispersant.

The inorganic pigment dispersant may optionally contain other compounding agents. Examples thereof include appropriate water-soluble polymers (e.g., polyvinyl alcohol), condensed phosphoric acid and salts thereof, and phosphonic acid and salts thereof. The inorganic pigment dispersant may contain a solvent such as water.

The inorganic pigment dispersant can exhibit favorable performances as a dispersant for heavy or light calcium carbonate, clay, and the like inorganic pigments used in paper coating. For example, dispersion of a mixture of a small amount of the inorganic pigment dispersant and an inorganic pigment in water leads to a concentrated inorganic pigment slurry (e.g., concentrated calcium carbonate slurry) that has low viscosity and high fluidity and is excellent in stability of these properties over time.

If the inorganic pigment dispersant is used as a dispersant for inorganic pigments, the inorganic pigment dispersant is preferably used in 0.05 to 2.0 parts by mass for 100 parts by weight of the inorganic pigment. If the amount of the inorganic pigment dispersant is within this range, a sufficient dispersion effect can be obtained. Also, the effect can be commensurate with the amount of the dispersant added, which may be economically advantageous.

EXAMPLES

In the following, the present invention is described in more detail with reference to examples. The examples are not intended to limit the scope of the present invention. If not otherwise specified, the term "part(s)" means "part(s) by mass", and the term "%" means "% by mass." Hereinafter, acrylic acid is referred to as "AA," sodium 3-allyloxy-2-hydroxy-1-propanesulfonate is referred to as "HAPS," sodium persulfate is referred as "NaPS," sodium bisulfite is referred as "SBS," hydrogen peroxide is referred to as "HP," and sodium acrylate is referred as "SA."

With regard to the concentration of aqueous solutions of these chemicals, for example, an 80% by mass aqueous acrylic acid solution is referred to as "80% AA," and a 40% by mass aqueous sodium 3-allyloxy-2-hydroxy-1-propanesulfonate solution is referred to as "40% HAPS."

For clarity, "AA" may be referred to as "100% AA."

Quantitation of the monomers, measurements of the weight average molecular weight and the number average molecular weight of the copolymer, and evaluations of the copolymer were performed in accordance with the following methods.

<Quantitation of Monomer>

The amounts of the monomers and the like components were determined under the following conditions by liquid chromatography.
Device: L-7000 series from Hitachi, Ltd.
Detector: UV Detector L-7400 from Hitachi, Ltd.
Column: Shodex RSpak DE-413L from Showa Denko K.K.
Flow rate: 1.0 ml/min
Column temperature: 40° C.
Moving phase: a 0.1% aqueous phosphoric acid solution <Measurement Conditions of Weight Average Molecular Weight and Number Average Molecular Weight>

The weight average molecular weight and the number average molecular weight of the copolymer were determined by gel permeation chromatography under the following conditions.
Device: HLC-8320GPC from Tosoh Corporation
Detector: RI
Column: Shodex Asahipak GF-310-HQ, GF-710-HQ, GF-1G from Showa Denko K.K.
Column temperature: 40° C.
Flow rate: 0.5 ml/min
Calibration curve: POLYACRYLIC ACID STANDARD from Sowa Kagaku Co., Ltd.
Eluent: a 0.1 N aqueous acetic acid solution <Measurement of Terminal Sulfonic Acid Group>

The copolymer (aqueous solution) having a pH adjusted to 1 was dried at room temperature under reduced pressure to remove water. Thereafter, $^1$HNMR measurement was performed using deuterated water as a solvent, and the dried product was checked for the presence or absence of a peak of 2.7 ppm assigned to a sulfonic acid group introduced to an end of the copolymer.

<Determination of Solids Content>

The copolymer (a mixture of 1.2 g of the copolymer composition and 2.0 g of water) was left in an oven heated to 120° C. for two hours to be dried. From the change in the mass before and after the drying, the solids content (%) and volatile components content (%) were calculated.

<Determination of Gel Resistance>

The gel resistance was determined by the gel resistance test described above.

<Determination of Chelating Ability (Calcium Ion-Capturing Ability)>

The chelating ability was determined by the method of measuring the calcium ion-capturing ability described above.

Example 1

A 2.5-L SUS316 separable flask equipped with a thermometer, a reflux condenser, and a stirrer was charged with 260.7 g of pure water and 0.033 g (3 ppm in the mass of iron (II) equivalent based on the total fed amount (the total fed amount herein means the amount of all the materials including materials fed in the neutralizing step performed after the completion of the copolymerization. The same shall apply hereinbelow.)) of Mohr's salt, followed by heating to 87° C. with stirring (initial feed).

Subsequently, under stirring, 464.9 g (5.17 mol) of an 80% by mass aqueous AA solution (hereinafter, referred to as 80% AA"), 618.0 g (1.14 mol) of a 40% by mass aqueous HAPS solution (hereinafter, referred to as "40% HAPS"), 168.0 g of a 15% by mass aqueous NaPS solution (hereinafter, referred to as "15% NaPS"), 59.4 g of a 35% by mass aqueous SBS solution (hereinafter, referred to as"35% SBS"), and 4.5 g of a 35% by mass aqueous HP solution (hereinafter, referred as "35% HP") were dropped through separate dropping nozzles to the copolymerization reaction system kept at a constant temperature of 87° C. The drop time of the 80% AA, the 40% HAPS, the 35% SBS, the 15% NaPS, and the 35% HP were respectively 180 minutes, 140 minutes, 170 minutes, 200 minutes, and 5 minutes. The dropping of all the aqueous solutions except for the 35% HP was simultaneously started. The dropping of the 35% HP was started 185 minutes after the start of the dropping of the other materials. Regarding the 40% HAPS, 154.5 g of the 40% HAPS was continuously dropped at a constant drop rate over a period from 0 to 15 minutes, and the rest (463.5 g) was continuously dropped at a constant drop rate over a period from 15 to 140 minutes. Regarding the 15% NaPS, 79.8 g of the 15% NaPS was continuously dropped at a constant drop rate over a period from 0 to 130 minutes, and the rest (88.2 g) was continuously dropped at a constant drop rate over a period from 130 to 200 minutes. The 80% AA and 35% SBS were each dropped continuously at a constant rate throughout the respective drop times.

After the completion of the dropping, the reaction solution was kept at 87° C. for another 60 minutes to be aged. Thereby, the copolymerization was completed. This provided a copolymer composition (1) (the copolymer contained therein is defined as "polymer (1)") of this example having a solids concentration of 46% by mass.

The pH of the copolymer composition (1) thus obtained was adjusted to 1 with sulfuric acid. The copolymer composition (1) was dried at room temperature under reduced pressure to remove water and then subjected to $^1$HNMR measurement using deuterated water as a solvent. A peak derived from introduction of a sulfonic acid (salt) group to an end of the main chain of the polymer was observed at 2.7 ppm.

Example 2

A copolymer composition (2) (the copolymer contained therein is defined as "polymer (2)") was obtained in the same manner as in Example 1 except that the amount of pure water was 255.0 g and that of the 35% SBS was 90.0 g; and 154.5 g of the 40% HAPS was dropped over a period from 0 to 20 minutes and the rest (463.5 g) of the 40% HAPS was dropped over a period from 20 to 140 minutes.

Example 3

A copolymer composition (3) (the copolymer contained therein is defined as "polymer (3)") was obtained in the same manner as in Example 2 except that the amount of pure water was 258.3 g and that of the 35% SBS was 72.0 g.

Example 4

A copolymer composition (4) (the copolymer contained therein is defined as "polymer (4)") was obtained in the same manner as in Example 3 except that the amount of pure water was 239.5 g, that of the 80% AA was 442.8 g (4.92 mol), that of the 40% HAPS was 670.4 g (1.23 mol), that of the 15% NaPS was 164.0 g, that of the 35% SBS was 79.1 g, and that of the 35% HP was 4.4 g; and 167.6 g of the 40% HAPS was dropped over a period from 0 to 20 minutes and the rest (502.8 g) of the 40% HAPS was dropped over a period from 20 to 140 minutes, and 77.9 g of the 15% NaPS was dropped over a period from 0 to 130 minutes and the rest (86.1 g) of the 15% NaPS was dropped over a period from 130 to 200 minutes.

Example 5

A copolymer composition (5) (the copolymer contained therein is defined as "polymer (5)") was obtained in the same manner as in Example 4 except that the amount of pure water was 243.6 g, that of the 80% AA was 390.3 g (4.34 mol), that of the 40% HAPS was 519.1 g (0.95 mol), that of the 15% NaPS was 138.9 g, that of the 35% SBS was 120.9 g, and no 35% HP was added; the drop time of the 40% HAPS was 120 minutes; and 129.8 g of the 40% HAPS was dropped over a period from 0 to 20 minutes and the rest (389.3 g) of the 40% HAPS was dropped over a period of 20 to 120 minutes, and 65.7 g of the 15% NaPS was dropped over a period from 0 to 130 minutes and the rest (73.2 g) was dropped over a period from 130 to 200 minutes.

Comparative Example 1

A 2.5-L SUS316 separable flask equipped with a thermometer, a reflux condenser, and a stirrer was charged with 267.5 g of pure water, 100.0 g (0.18 mol) of 40% HAPS, and 0.033 g (3 ppm in the mass of iron (II) equivalent based on the total fed amount) of Mohr's salt. Under stirring, the system was heated to the boiling point to be refluxed (initial feed).

Subsequently, under stirring, 464.9 g (5.17 mol) of 80% AA, 518.3 g (0.95 mol) of 40% HAPS, 165.5 g of 15% NaPS, and 56.2 g of 35% SBS were dropped through separate dropping nozzles to the copolymerization reaction system kept at the refluxing state at the boiling point. The drop time of the 80% AA, the 40% HAPS, the 35% SBS, and the 15% NaPS were respectively 180 minutes, 130 minutes, 170 minutes, and 200 minutes. The dropping of all the aqueous solutions was simultaneously started. Regarding the 15% NaPS, 78.3 g of the 15% NaPS was continuously dropped at a constant drop rate over a period from 0 to 130 minutes and the rest (87.2 g) was continuously dropped at a constant drop rate over a period from 130 to 200 minutes. The 80% AA, 40% HAPS and 35% SBS were each dropped continuously at a constant rate throughout the respective drop times.

After the completion of the dropping, the reaction solution was kept at the refluxing state at the boiling point for another 30 minutes to be aged. Thereby, the copolymerization was completed. This provided a comparative copolymer composition (1) (the copolymer contained therein is defined as "comparative polymer (1)") having a solids concentration of 46% by mass.

The pH of the comparative copolymer composition (1) thus obtained was adjusted to 1 with sulfuric acid. The copolymer composition (1) was dried at room temperature under reduced pressure to remove water and then subjected to $^1$HNMR measurement using deuterated water as a solvent. A peak derived from introduction of a sulfonic acid (salt) group to an end of the main chain of the copolymer was observed at 2.7 ppm.

Comparative Example 2

A comparative copolymer composition (2) (the copolymer contained therein is defined as "comparative polymer (2)") was obtained in the same manner as in Comparative Example 1 except that the amount of the pure water was 228.0 g, that of the 40% HAPS for the initial feed was 114.5 g (0.21 mol), no Mohr's salt was added, the amount of 80% AA was 482.0 g (5.36 mol), that of the 40% HAPS for dropping was 400.5 g (0.73 mol), and that of the 35% SBS was 140.4 g; and the drop time of the 35% SBS was 180 minutes.

Comparative Example 3

A 2.5-L SUS316 separable flask equipped with a thermometer, a reflux condenser, and a stirrer was charged with 427.0 g of pure water and 137.9 g (0.16 mol) of a 25% by mass aqueous HAPS solution (hereinafter, referred to as "25% HAPS"). Under stirring, the system was heated to the boiling point to be refluxed (initial feed).

Subsequently, under stirring, 35.7 g (0.40 mol) of 80% AA, 775.1 g (3.0 mol) of a 37% by mass aqueous SA solution (hereinafter, referred as "37% SA"), 553.4 g (0.63 mol) of 25% HAPS, 85.8 g of 15% NaPS, and 18.2 g of 35% HP were dropped through separate dropping nozzles to the copolymerization reaction system kept at the refluxing state at the boiling point. The drop time of the 80% AA, the 37% SA, the 25% HAPS, the 15% NaPS, and the 35% HP were respectively 120 minutes, 120 minutes, 90 minutes, 140 minutes, and 120 minutes. The dropping of all the solutions was simultaneously started. Each of the solutions was dropped continuously at a constant rate throughout the respective drop times.

After the completion of the dropping, the reaction solution was kept at the refluxing state at the boiling point for another 30 minutes to be aged. Thereby, the copolymerization was completed. This provided a comparative copolymer composition (3) (the copolymer contained therein is defined as "comparative polymer (3)") having a solids concentration of 27% by mass.

The pH of the comparative copolymer composition (3) thus obtained was adjusted to 1 with sulfuric acid. The copolymer composition (3) was dried at room temperature under reduced pressure to remove water and then subjected to $^1$HNMR measurement using deuterated water as a solvent. No peak derived from introduction of a sulfonic acid (salt) group to an end of the main chain of the copolymer was observed.

Comparative Example 4

A comparative copolymer composition (4) (the copolymer contained therein is defined as "comparative polymer (4)") was obtained in the same manner as in Comparative Example 3 except that the amount of the pure water was 424.5 g, no 25% HAPS was added in the initial feed step, the amount of the 25% HAPS for dropping was 691.3 g (0.79 mol), and that of the 35% HP was 12.1 g.

Comparative Example 5

A 2.5-L SUS316 separable flask equipped with a thermometer, a reflux condenser, and a stirrer was charged with 166.4 g of demineralized water. Under stirring, the system was heated to the boiling point to be refluxed (initial feed).

Subsequently, under stirring, 189.0 g (2.63 mol) of 100% AA, 476.9 g (0.88 mol) of 40% HAPS, 91.9 g of a 20% by mass aqueous NaPS solution (hereinafter, referred to as "20% NaPS"), 73.8 g of a 37% by mass aqueous SBS solution (hereinafter, referred to as "37% SBS") were dropped through separate dropping nozzles to the copolymerization reaction system kept at the refluxing state at the boiling point. The drop time of the 100% AA, the 40% HAPS, the 37% SBS, and the 20% NaPS were respectively 120 minutes, 100 minutes, 120 minutes, and 140 minutes. The dropping of all the solutions was simultaneously started. After the completion of the dropping, the reaction solution was kept at the refluxing state at the boiling point for another 30 minutes to be aged. Thereby, the copolymerization was completed. This provided a comparative copolymer composition (5) (the copolymer contained therein is defined as "comparative polymer (5)") having a solids concentration of 46% by mass.

The pH of the comparative copolymer composition (5) thus obtained was adjusted to 1 with sulfuric acid. The copolymer composition (5) was dried at room temperature under reduced pressure to remove water and then subjected to $^1$HNMR measurement using deuterated water as a solvent. A peak derived from introduction of a sulfonic acid (salt) group to an end of the main chain of the copolymer was observed at 2.7 ppm.

Comparative Example 6

A comparative copolymer composition (6) (the copolymer contained therein is defined as "comparative polymer (6)") was obtained in the same manner as in Comparative Example 5 except that the amount of the demineralized water was 179.8 g, that of the 100% AA was 214.2 g (2.98 mol), that of the 40% HAPS was 286.1 g (0.52 mol); 67.7 g of 15% NaPS was used instead of the 20% NaPS (91.9 g); and the drop time of the 40% HAPS was 90 minutes, and that of the 15% NaPS was 140 minutes.

The polymer contained in the comparative copolymer composition (6) contained the structural unit (a) in a proportion of 15.0 mol % and had a weight average molecular weight of 7300. The comparative copolymer composition (6) contained residual HAPS in an amount of 15600 ppm (based on the composition) and residual AA in an amount of 1670 ppm (based on the composition).

The pH of the comparative copolymer composition (6) thus obtained was adjusted to 1 with sulfuric acid. The copolymer composition (6) was dried at room temperature under reduced pressure to remove water and then subjected to $^1$HNMR measurement using deuterated water as a solvent. A peak derived from introduction of a sulfonic acid (salt) group to an end of the main chain of the copolymer was observed at 2.7 ppm.

The weight average molecular weights and the number average molecular weights of the polymers (1) to (5) and the comparative polymers (1) to (4) were measured. Also, the polymers and comparative polymers were evaluated for the gel resistance (degree of gelation) and the calcium ion-capturing ability (Ca capturing ability). The measurement methods and the evaluation methods employed were as described above. The results are shown in Table 1.

For the polymer compositions (1) to (5) and the comparative polymer compositions (1) to (5), the amount (based on the composition) of residual HAPS and the amount (based on the composition) of residual AA were determined. The results are shown in Table 2.

TABLE 1

|  | Proportion of structural unit (a) (mol %) | Sulfonic acid (salt) group at the end of main chain of copolymer | Mw | Mw/Mn | Degree of gelation (absorbance) | Ca capturing ability (mgCaCO$_3$/g) |
|---|---|---|---|---|---|---|
| Example 1 | 18.0 | present | 13500 | 3.3 | 0.039 | 204 |
| Example 2 | 18.0 | present | 8500 | 3.0 | 0.023 | 191 |
| Example 3 | 18.0 | present | 10500 | 3.0 | 0.029 | 206 |
| Example 4 | 20.0 | present | 10500 | 3.2 | 0.005 | 204 |
| Example 5 | 18.0 | present | 5500 | 2.5 | 0.021 | 175 |
| Comparative Example 1 | 18.0 | present | 20000 | 3.7 | 0.044 | 218 |
| Comparative Example 2 | 15.0 | present | 9200 | 3.0 | precipitation occurred | 180 |
| Comparative Example 3 | 18.7 | absent | 6300 | 2.8 | 0.112 | 197 |
| Comparative Example 4 | 18.7 | absent | 4400 | 2.2 | 0.048 | 171 |

TABLE 2

|  | Proportion of structural unit (a) (mol %) | Sulfonic acid (salt) group at the end of main chain of copolymer | Mw | Amount of residual HAPS (ppm, based on composition) | Amount of residual AA (ppm, based on composition) |
|---|---|---|---|---|---|
| Example 1 | 18.0 | present | 13500 | 4600 | <10 |
| Example 2 | 18.0 | present | 8500 | 4400 | <10 |
| Example 3 | 18.0 | present | 10500 | 4400 | <10 |
| Example 4 | 20.0 | present | 10500 | 7400 | 10 |
| Example 5 | 18.0 | present | 5500 | 10100 | 360 |
| Comparative Example 1 | 18.0 | present | 20000 | 10900 | 540 |
| Comparative Example 2 | 15.0 | present | 9200 | 3500 | 490 |
| Comparative Example 3 | 18.7 | absent | 6300 | 9300 | 100 |
| Comparative Example 4 | 18.7 | absent | 4400 | 9000 | 140 |
| Comparative Example 5 | 25.0 | present | 4400 | 35500 | 710 |

The evaluation results above reveal that the copolymers of Examples 1 to 5 had good gel resistance under high hardness conditions and suitable chelating ability (calcium ion-capturing ability) as compared with the copolymers of Comparative Examples 1 to 4.

Comparison between Examples 1 to 5 and Comparative Example 1 reveals that if the copolymer has a weight average molecular weight of more than 18000, the copolymer has a high degree of gelation (a lowered gel resistance).

Comparison between Examples 1 to 5 and Comparative Example 2 reveals that if the proportion of the structural unit (a) derived from the monomer (A) represented by Formula (1) is less than 16 mol %, the degree of gelation is high (gel resistance is low).

Comparison between Examples 1 to 5 and Comparative Examples 3 and 4 reveals that if no sulfonic acid (salt) group was present at any end of the main chain of the copolymer, the degree of gelation is high (gel resistance is low).

INDUSTRIAL APPLICABILITY

The copolymer of the present invention has high gel resistance and high chelating ability, and therefore exhibits excellent performances especially when the copolymer is used in a water treatment agent (especially a scale inhibitor), a dispersant, or the like additive.

The invention claimed is:

1. A (meth)acrylic acid-based copolymer comprising, as structural units:
   16 mol % or more but 24 mol % or less of a structural unit (a) derived from a monomer represented by Formula (1):

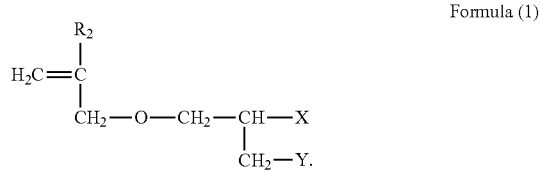

Formula (1)

wherein $R_2$ represents a hydrogen atom or a methyl group, and

X and Y each independently represent a hydroxyl group, a sulfonic acid group, or a sulfonic acid salt group, at least one group selected from the group consisting of X and Y representing a sulfonic acid group or a sulfonic acid salt group; and 76 mol % or more but 84 mol % or less of a structural unit (b) derived from (meth)acrylic acid or a salt thereof, wherein each of the mol % for the structural unit (a) and the mol % for the structural unit (b) is based on a total amount of structural units derived from monomers as 100 mol %, the copolymer comprises in a main chain a sulfonic acid group or a sulfonic acid salt group at at least one end thereof, the copolymer has a weight average molecular weight in a range from 8500 to 18000, when the weight average molecular weight is determined by gel permeation chromatography under following conditions: with HLC-8320GPC of Tosoh Corporation as a device; an RI detector; Shodex Asahipak GF-310-HQ, GF-710-HQ, and GF-1G of Showa Denko K.K. as columns; POLYACRYLIC ACID STANDARD of Sowa Kagaku Co., Ltd. as a standard for a calibration curve; and a 0.1 N aqueous acetic acid solution as an eluent; at a column temperature of 40° C.; and at a flow rate of 0.5 ml/min, and the copolymer has a gelation degree in a range of smaller than 0.040.

2. A method of producing the (meth)acrylic acid-based copolymer according to claim 1, the method comprising:

copolymerizing 16 mol % or more but 24 mol % or less of the monomer represented by the Formula (1):

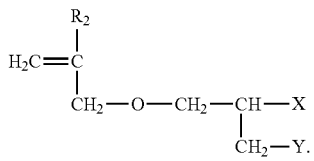

Formula (1)

wherein $R_2$ represents a hydrogen atom or a methyl group,

X and Y each independently represent a hydroxyl group, a sulfonic acid group, or a sulfonic acid salt group, at least one group selected from the group consisting of X and Y representing a sulfonic acid group or a sulfonic acid salt group, 76 mol % or more but 84 mol % or less of the (meth)acrylic acid or the salt thereof as essential components, in the presence of a bisulfurous acid or a salt thereof, and each of the mol % for the monomer represented by the Formula (1) and the mol % for the (meth)acrylic acid or the salt thereof is based on a total amount of all monomers as 100 mol %, wherein the copolymerizing step further comprises:
 a dropwise addition of the bisulfurous acid or the salt thereof;
 a dropwise addition of the monomer represented by the Formula (1); and
 a dropwise addition of the (meth)acrylic acid or the salt thereof,
to a reaction vessel, and
 the dropwise addition of the bisulfurous acid or the salt thereof is completed at a time from 1 to 30 minutes earlier than the dropwise addition of the (meth)acrylic acid or the salt thereof.

3. The (meth)acrylic acid-based copolymer according to claim 1, which has a weight average molecular weight in a range from 10500 to 12000, when determined by the gel permeation chromatography under the conditions as recited in claim 1.

4. The (meth)acrylic acid-based copolymer according to claim 1, wherein the (meth)acrylic acid-based copolymer has a calcium ion-capturing ability of 190 mgCaCO$_3$/g or more.

5. The (meth)acrylic acid-based copolymer according to claim 1, wherein a degree of neutralization of carboxylic acid in the copolymer is in a range from 0 to 70 mol %.

6. The method of producing the (meth)acrylic acid-based copolymer according to claim 2,
wherein the copolymerizing step is performed in the presence of persulfate and hydrogen peroxide in addition to the bisulfurous acid or the salt thereof.

7. The method of producing the (meth)acrylic acid-based copolymer according to claim 6,
wherein the bisulfurous acid or the salt thereof is present in the copolymerizing step in an amount from 1 to 20 g relative to 1 mole of a total amount of all monomers used for the copolymerizing step.

8. The method of producing the (meth)acrylic acid-based copolymer according to claim 6,
wherein a total amount of the bisulfurous acid or the salt thereof and the persulfate present in the copolymerizing step is in a range from 2 to 20 g relative to 1mole of a total amount of all monomers used for the copolymerizing step.

9. The method of producing the (meth)acrylic acid-based copolymer according to claim 6,
wherein the hydrogen peroxide is present in the copolymerizing step in an amount of 15 g or less relative to 1 mole of a total amount of all monomers used for the copolymerizing step.

* * * * *